United States Patent [19]
Beckert et al.

[11] Patent Number: 5,949,345
[45] Date of Patent: Sep. 7, 1999

[54] DISPLAYING COMPUTER INFORMATION TO A DRIVER OF A VEHICLE

[75] Inventors: Richard D. Beckert, Lake Stevens; Mark M. Moeller, Des Moines; Li Zhou, Bellevue, all of Wash.

[73] Assignee: Microsoft Corporation, Redmond, Wash.

[21] Appl. No.: 08/863,377

[22] Filed: May 27, 1997

[51] Int. Cl.⁶ ............................................ G08B 5/00
[52] U.S. Cl. .................. 340/815.41; 340/439; 340/461; 348/837
[58] Field of Search ................... 340/439, 459, 340/461, 462, 525, 441, 466, 815.41; 701/29, 32; 348/837; 353/13, 14

[56] References Cited

U.S. PATENT DOCUMENTS

| | | | |
|---|---|---|---|
| 4,908,611 | 3/1990 | Iino | 340/980 |
| 5,148,153 | 9/1992 | Haymond | 340/461 |
| 5,519,410 | 5/1996 | Smalanskas et al. | 345/7 |
| 5,541,572 | 7/1996 | Okamoto et al. | 340/428 |
| 5,548,764 | 8/1996 | Duley et al. | 395/750 |

FOREIGN PATENT DOCUMENTS 0 672 892 A1  9/1995  European Pat. Off. .
0 771 686 A2  5/1997  European Pat. Off. .

*Primary Examiner*—Jeffery A. Hofsass
*Assistant Examiner*—Anh La
*Attorney, Agent, or Firm*—Lee & Hayes, PLLC

[57] ABSTRACT

A vehicle computer system includes a display device that is configurable for viewing by a driver of a vehicle while the vehicle is moving. The display device is responsive to a processor that executes application programs in conjunction with an operating system. A plurality of sensors are used to indicate the position of the display device, to indicate vehicle motion, and to indicate the state of a chosen vehicle control such as a parking brake. Application programs open display windows in conjunction with the operating system. In opening a window, an application program can indicate whether the window will contain driving-related information. The operating system monitors the sensors and prevents the display of non-driving-related windows to the driver when the vehicle is in motion or when it has the potential for motion. Specifically, the operating system in such a situation hides any windows that have not been specified as being driving-related. Initially, all windows are assumed to contain non-driver related information; hence, they are hidden until it is determined what type of information they display.

20 Claims, 3 Drawing Sheets

DISPLAYING COMPUTER INFORMATION TO A DRIVER OF A VEHICLE

TECHNICAL FIELD

This invention relates to systems for preventing display of distracting materials to a driver of a vehicle.

BACKGROUND OF THE INVENTION

Computers and other computer-like entertainment devices are being developed for installation and/or use in automobiles. Such devices can be used for a variety of purposes, ranging from entertainment to the control of basic automobile functions. Two patent applications filed by Microsoft Corporation of Redmond, Wash. disclose a device intended for automobile use: the US Patent Application entitled "Vehicle Computer System," Ser. No. 08/564,586, filed Nov. 29, 1995; and the US Patent Application entitled "Vehicle Computer System with High Speed Data Buffer and Serial Interconnect," Ser. No. 08/668,781, filed Jun. 24, 1996. The device described in these applications potentially incorporates a variety of components, such as a radio, cell phone, CD player, etc. In addition, the device is designed to execute user-provided application programs. Such programs might be used for entertainment, for business, or for practical functions such as navigation.

Visual or graphical output of such devices might create a distraction for a driver of a vehicle, thereby impairing his or her ability to drive safely. Furthermore, laws in the United States and elsewhere restrict the types of graphical materials which can legally be presented to a driver. Some laws prohibit any type of graphical display while the vehicle is in motion. Others prohibit certain information from being displayed whenever there is a potential for movement—such as when the parking brake is released or when the vehicle's transmission is not in "park." Some laws prohibit only entertainment materials or information, while allowing more utilitarian information, such as navigational aids, to be displayed to the driver at any time.

Because of concerns relating to safety and legality, it had been thought that the opportunities for graphical output in conjunction with automobile computers would be quite limited. However, the inventors have developed a way to display useful information to a driver and to other automobile occupants, while remaining within the safety and legal constraints described above.

SUMMARY OF THE INVENTION

The invention utilizes a plurality of sensors to detect the position of a display device, to detect vehicle movement, and possibly to monitor a vehicle control such as the parking brake or the transmission shift linkage. When the display device is turned away from the driver, any type of information is allowed to be displayed. Similarly, when the vehicle is stopped and has its parking brake set or is in "park," any type of information is allowed to be displayed even if the display device is turned toward the driver. When these conditions are not met, however, only non-driving-related information is allowed to be displayed.

The operating system enforces the limitation on displayed information by assuming initially that all information is not driving-related. Individual application programs, however, can designate certain information to be driving-related, and the operating system will then display such information to the driver even when the vehicle is moving.

Application programs make such a designation when requesting a window from the operating system. As part of a request, the application program supplies an attribute indicating that a window has information that relates to driving.

DETAILED DESCRIPTION

Figure 1:
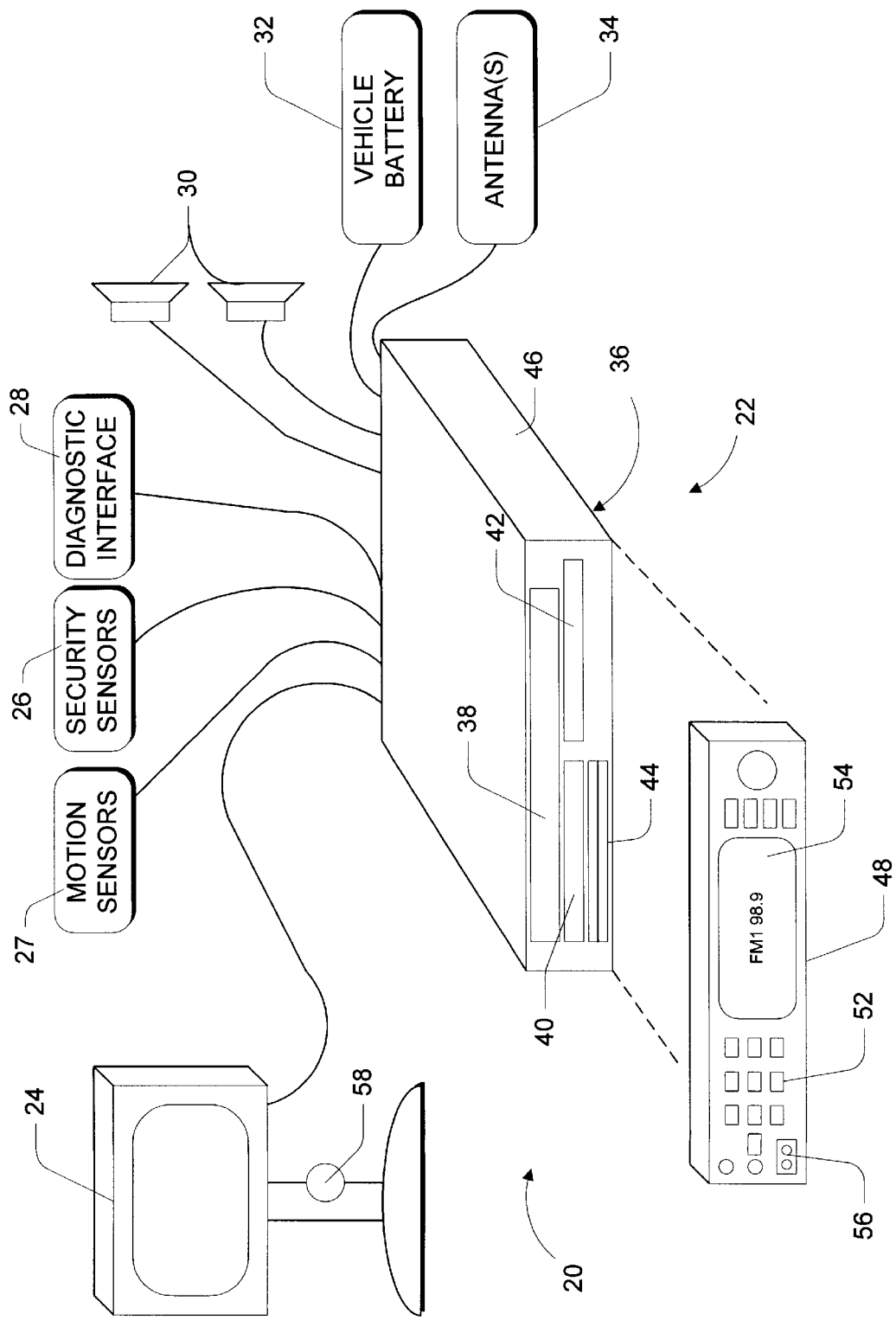
FIG. 1 shows an example of a vehicle computer system in accordance with the invention.

FIG. 1 shows a vehicle computer system 20 according to one implementation of the invention. Vehicle computer system 20 has a centralized computer 22 coupled to various peripheral devices including a display device or monitor 24, security sensors 26, motion sensors 27, a vehicle diagnostic interface 28, speakers 30, vehicle battery 32, and antenna(s) 34. The computer 22 is assembled in a housing 36 that is sized to be mounted in a vehicle dashboard, similar to a conventional car stereo. Preferably, the housing 36 has a form factor of a single DIN (Deutsche Industry Normen). Alternatively, it could be housed in a 2 DIN unit or other special form factor customized for an OEM.

The computer 22 uses an open hardware platform and operating system combination, to support multiple applications. Various software applications and hardware peripherals can be produced by independent vendors and subsequently installed after purchase of the computer system or vehicle. This is advantageous in that the software applications do not need to be dedicated to specially designed systems. The open architecture preferably utilizes a multitasking operating system that employs a graphical user interface. One preferred operating system is a Windows® brand operating system sold by Microsoft Corporation, such as Windows 95®, Windows NT®, Windows CE®, or other derivative versions of Windows®. A multitasking operating system allows simultaneous execution of multiple applications.

The computer 22 includes at least one storage drive which permits the vehicle user to download programs and data from a digital storage medium. In the illustrated implementation, the computer 22 has a CD-ROM drive 38 which reads application-related CDs, as well as musical, video, game, or other types of entertainment CDs. In this manner, the CD-ROM drive 38 performs a dual role of storage drive and entertainment player. Also, a hard disk drive (not shown) may be included for storing both application programs and user data. A system without a hard disk will contain applications, normally stored in flash memory, ROM, or DRAM, and user data stored in DRAM. The computer 22 has an optional 3.5" floppy diskette drive 40, a smart card reader 42, and dual PCMCIA card sockets 44 which accept PCMCIA card types I, II and III.

The storage drives are mounted in a stationary base unit 46 of housing 36. The base unit 46 is constructed and sized to be fixedly mounted in the dashboard. The housing 36 also has a faceplate 48 which is pivotally mounted to the front of the base unit 46. The faceplate can be rotated to permit easy and convenient access to the storage drives.

Computer 22 has a keypad 52 and a display 54 on the faceplate 48. The display 54 is preferably a back lit LCD. The operating system executing on computer 22 controls the faceplate keys 52 and the faceplate display 54 as peripheral devices when the faceplate is attached to the base unit. Additionally, the computer contains a voice recognition engine and a microphone conveniently located to permit the user to verbally enter commands in a hands-free, eyes-free environment. Voice commands can be used for controlling most operating modes of the vehicle computing platform. The computer 22 is also equipped with an IrDA (infrared developers associations transceiver port 56 mounted on the faceplate 48 to transmit and receive data and programs using infrared signals. The entire faceplate unit 48 behaves as a multifunction peripheral to the computing platform.

To load an application program or data onto the computer 22, the vehicle user inserts a CD a diskette or connects to an Internet service provide through a wireless link, if the application is not already contained on the hard disk or internal memory, and the operating system downloads the application or data therefrom. The installation process can be automatically handled by the operating system, or might require the assistance of commands input from the user in the form of keyed sequences on the keypad 52 or verbal instructions using the voice recognition device. Another technique to load data or applications or transfer data with other computing devices is through the use of the IrDA transceiver port 56.

The computer 22 can output visual data to the LCD 54 at the faceplate, or to the standalone display device 24. Display device 24 is preferably a small flat panel display (e.g., 6.4" screen) that is movably mounted on a stand or yoke and remotely located from the computer. Display device 24 may be configurable for viewing by a driver of a vehicle while the vehicle is moving. Specifically, the monitor may be movable between a first position in which it is viewable by the driver, and a second position in which it is not viewable by the driver—the movable monitor is fully adjustable to different viewing positions that can be seen by the driver or other passengers in the vehicle. Additionally, there may be other fixed display devices in the vehicle that are either visible or not visible by the driver.

In general, the vehicle computer system 20 can be used to integrate multiple vehicle-related systems onto one open platform hardware and software architecture. For instance, the vehicle computer system 20 can serve as a multimedia entertainment system, a navigation system, a communications system, a security system, and a diagnostics system. Moreover, the vehicle computer system 20 provides additional functionality traditionally associated with desktop and laptop personal computers. For instance, vehicle computer system 20 can support word processing applications, spreadsheet applications, database applications, and appointment/schedule applications. Furthermore, the vehicle computer system 20 can be configured to operate as a server to other computing units in the vehicle to distribute games, video movies, and the like to passengers.

The type of data displayed on monitor 24 can range widely from word instructions concerning the vehicle's performance, to diagrammatic directions used by the navigation system, to video movies for in-car entertainment. For purposes of this description, information to be displayed on the monitor is of two types—driving-related information that is supportive and helpful to driving (e.g., diagnostics, navigation directions), and non-driving-related information (e.g., video movies, games, broadcast television) that would be distracting to the driver. In accordance with the invention, only driving information is displayed to the driver of the vehicle when the vehicle is moving or has the potential to move.

The monitor 24 is equipped with a sensor or switch 58 which detects and indicates to the computer system when the display device is moved to its first or second positions—it indicates when the display device is configured for viewing by the driver. In one implementation, the switch is an electrical cylindrical switch which closes when the display is capable of being viewed by the driver.

Motion sensors 27 include one or more sensors that detect when the vehicle is moving and when the vehicle is in a condition where movement is possible or imminent. These sensors include an actual motion sensor that detects actual vehicle movement. Examples of sensors used for detecting vehicle motion include a speedometer, an accelerometer, wheel motion sensors, etc. Another sensor, referred to as a potential motion sensor, is configured in conjunction with a vehicle control such as a parking brake or a transmission control linkage. This sensor detects a control state indicating a potential for vehicle movement. For example, this sensor might be a mechanical switch connected to detect when a parking brake is set. Alternatively, the potential motion sensor might detect when the vehicle's transmission is in "park" or otherwise locked.

The various sensors are connected so that they can be read by computer 22. In the described embodiment, there is a single multi-conductor cable extending from computer 22 to display device 24. At a point near the display device, six conductors are split from this cable and terminated at an electrical plug. The sensors are connected to this plug. If these sensors are part of the vehicle and available over diagnostic interface 28, then additional sensors may not be required as the computer has access to the vehicle's sensors.

Of the six conductors, two are for power and ground, respectively. Limited power can be supplied for sensor operation at 5.0 volts.

The remaining four conductors are sensor inputs. One input is used as a signal regarding whether anything is connected to the plug. Whatever cable is used for connection to the plug is configured so that this input will be activated simply by connecting to the plug.

A second input is connected to display sensor 58. The third and fourth inputs are connected to motion sensors 27. Some configurations will not use the potential motion sensor. The system is configured so that the absence of such a sensor will be interpreted as an indication that there is no potential for movement. In other words, absence of the sensor will result in a signal that will be interpreted as if the vehicle has a parking brake that is set. However, absence of the actual motion sensor is interpreted to mean that the vehicle is moving.

Although 5V logic power is provided for the sensors, it is anticipated that some sensors will use unregulated vehicle power due to power requirements. Accordingly, all inputs utilize protection circuitry to avoid damage to computer components. The protection circuitry utilizes a low-pass filter in conjunction with a Zener diode to ensure that input levels do not exceed 3.3 volts. This ensures that the logic input to the computer (22) will work with either 3.3V or 5V computer design.

Figure 2:
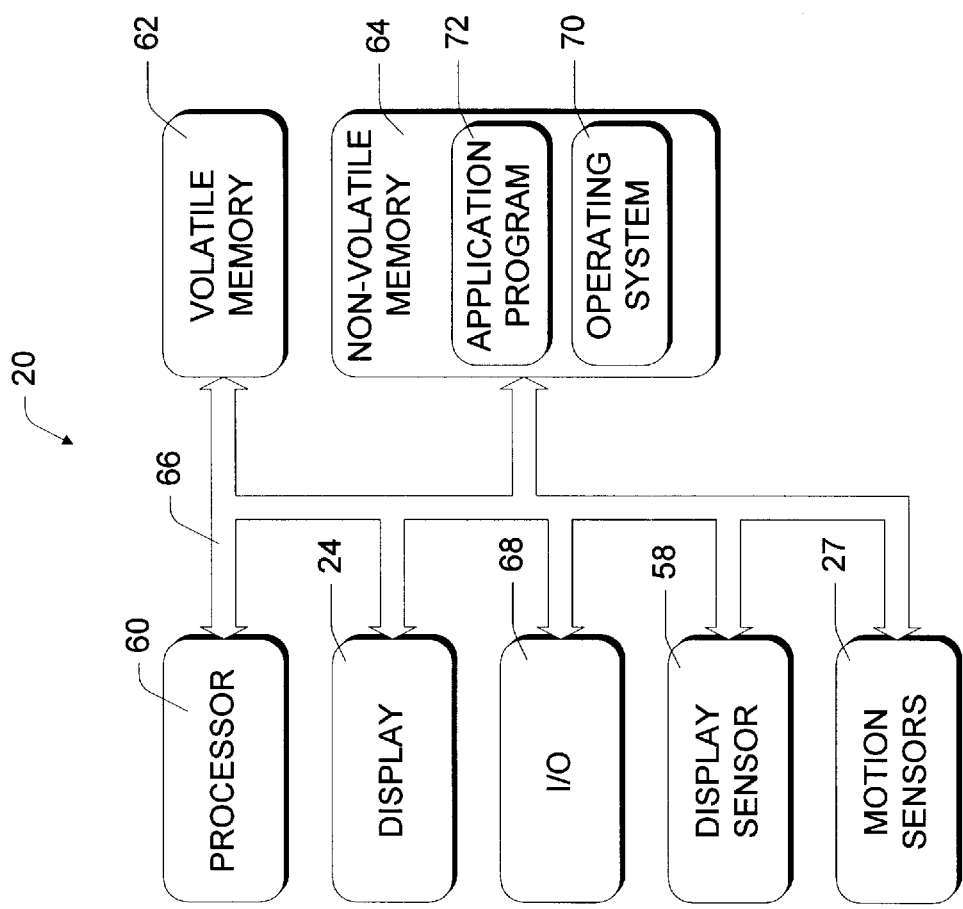
FIG. 2 shows pertinent components of the vehicle computer system in block form.

FIG. 2 shows pertinent components of system 20 in block form. System 20 has a processor 60 and one or more forms of computer-readable storage media. Specifically, system 20 includes a volatile memory 62 (e.g., RAM), and a non-volatile memory 64 interconnected by one or more internal buses. The non-volatile memory 64 potentially includes integrated circuit chips (e.g., ROM, EEPROM), disk drive (s) (e.g., floppy, optical, hard), or a combination of both.

Display device 24 is connected to bus 66 through appropriate hardware interface drivers (not shown), so that it responds to the control of processor 60. Additionally, various other components of FIG. 1, represented as I/O block 68, are connected through buses and appropriate I/O ports. For more detail regarding the specific configuration of this system, refer to the US Patent Application entitled "Vehicle Computer System," Ser. No. 08/564,586, filed Nov. 29, 1995; and the US Patent Application entitled "Vehicle Computer System with High Speed Data Buffer and Serial Interconnect," Ser. No. 08/668,781, filed Jun. 24, 1996. Both of these applications are hereby incorporated by reference.

System 20 runs an operating system 70, described above, which supports multiple applications. Operating system 70 is stored in non-volatile memory 64 and executes on processor 60. Operating system 70 implements control logic for performing the functions and steps described below. An application program 72 is also stored in non-volatile memory 64. Processor 60 is capable of reading and executing application program 72 in conjunction with operating system 70.

In addition to the components described above, display sensor 58 and motion sensors 27 are connected to be read by processor 60 as described above. That is, processor 60 can read whether or not the sensors have been activated.

Figure 3:
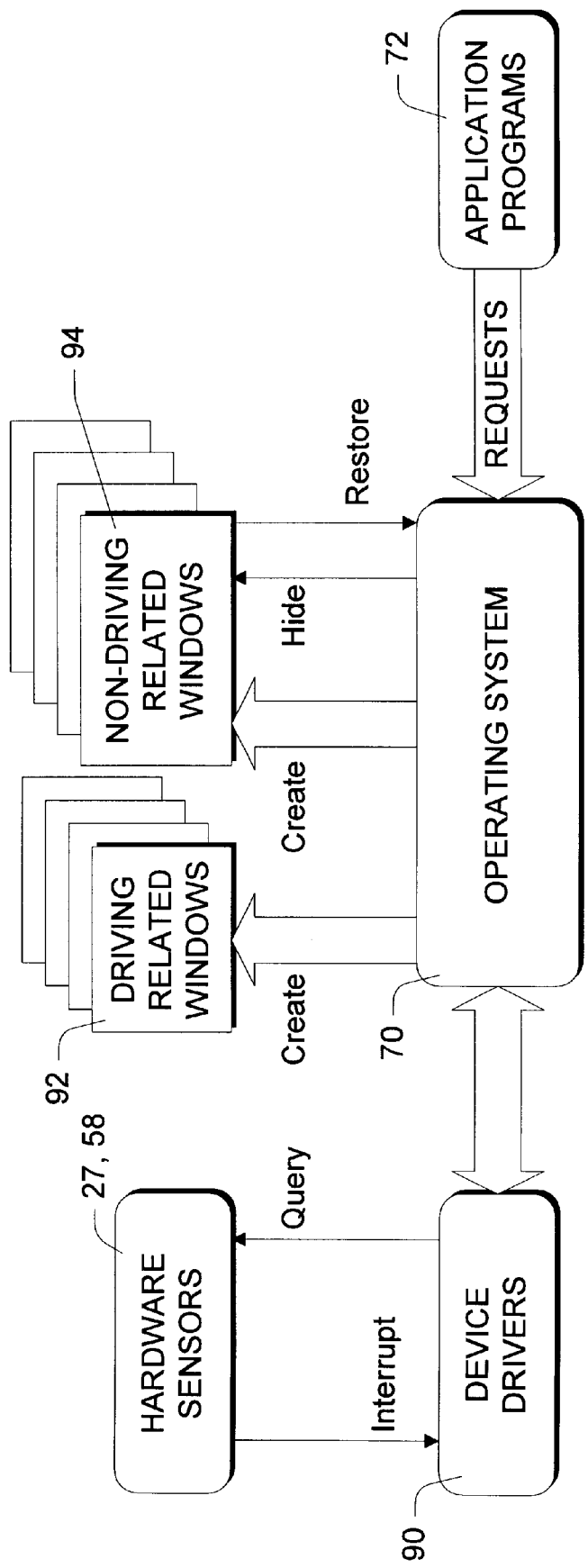
FIG. 3 is an information flow diagram illustrating the invention.

FIG. 3 shows communications between various elements of the system described above. Software device drivers 90 are provided to interface between hardware sensors 27, 58 and operating system 70. The hardware sensors are connected through interface hardware (not shown) to an interrupt input of processor 60, and the device drivers are configured to respond to this interrupt. Device drivers 90 are therefore called whenever there is a change of state at one of the sensor inputs. In response, the device drivers 90 query the hardware sensors to determine their current state. The operating system is notified of any changes. Thus, the operating system is apprised of whether the display device 24 is configured for viewing by the driver; whether the vehicle is moving; and whether the parking brake is set or the transmission is in park.

The operating system, in accordance with well-known Windows® programming techniques, allows application programs to open display windows on display device 24. Application programs such as application program 70 make specific requests to the operating system to open various display windows. The operating system creates the windows when requested, and returns information to the requesting program so that the requesting program can write data to the windows through the operating system.

In accordance with the invention, windows are created as either driving-related windows, indicated by reference numeral 92, or as non-driving-related windows, indicated by reference numeral 94.

The classification of certain windows as being "driving-related" or "non-driving-related" is not made subjectively by the operating system. Rather, application programs are allowed to designate certain windows, and the information contained therein, as being driving-related. If an application program does not specify a particular window as being driving-related, the window is assumed to be non-driving-related.

More specifically, applications written for execution in a Windows® operating system specify a number of windows attributes when requesting the creation of a window. For example, such attributes include size, relative position in a screen, color, etc. In accordance with the invention, these attributes are extended to include an indication of whether a window contains driving-related information. Specifically, an application can provide a bit that indicates this characteristic of a window. If the bit is set, the operating system treats the window as being driving-related. If the bit is not set, the operating system treats the window as being non-driving-related. If the bit is simply not provided, meaning that the application program has not been extended to take advantage of this feature, the operating system assumes that the window is not driving-related.

The operating system is configured to prevent display of non-driving-related information to the driver when the vehicle is moving, but to allow the display of non-driving-related information to the driver when the vehicle is not moving. More specifically, the operating system is responsive to motion sensors 27 to allow the display of non-driving-related windows whenever (a) the actual motion sensor indicates that the vehicle is not moving and (b) the potential motion sensor indicates that there is no potential for vehicle movement. The operating system is alternatively responsive to the display sensor to allow the display of non-driving-related windows whenever the display device is not configured or positioned for viewing by the driver.

Thus, driving-related information is displayed on the display device at all times. Non-driving-related information is displayed only when there is no potential for vehicle movement or when the display device is turned away from the driver. The operating system issues appropriate window hide and restore instructions to non-driving-related windows so that they are displayed and hidden at the appropriate times. Application programs are not involved in this process—they continue to execute as if they have full control of their windows.

While system 20 has been described primarily in terms of its features and functionality, the invention also includes steps performed by the operating system and the application program to implement the invention. The operating system and application program are conventionally stored on computer-readable storage media such as electronic memory, optical memory, or magnetic-based memory. The operating system will usually be stored in non-volatile memory of system 20, while the application program might be distributed on a portable storage medium such as a floppy disk, CD-ROM, or a PC card. In either case, the storage medium contains instructions for indicating the steps described below.

An application program in accordance with the invention performs steps of interacting with the operating system to open one or more display windows. Specifically, the application program submits requests to the operating system to open display windows, indicating in the requests whether respective windows contain driving-related information. Even more specifically, the application program provides and sets a specific attribute or style bit when opening a window, to indicate that the window is driving-related. If this attribute is not provided or is not set, the operating system hides the window at times when the driver might be distracted by the information contained therein.

The operating system performs steps of opening and displaying windows on the display device in response to requests by the application program. The operating system further performs a step of responding to more than one sensor to detect when the vehicle is moving and when it has the potential for movement (such as when the parking brake is not set or when the vehicle is in gear).

The operating system performs further steps of preventing display of non-driving-related information and windows to the driver when the vehicle is moving or when the vehicle has the potential for movement. However, the operating system allows the display of non-driving-related information when the display device is turned away from the driver. Display information is presented by hiding any windows that have not been specified as driving-related.

The invention provides a convenient and efficient way to discriminate between information that can safely be displayed to a driver, and information that would be distracting. The invention also provides an operating system with the information needed to determine when otherwise distracting information can safely be displayed.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A vehicle computer system comprising:
   a processor that is capable of executing application programs;
   a display device that is configurable for viewing by a driver of a vehicle while the vehicle is moving, the display device being responsive to the processor;
   an operating system that is executed by the processor;
   the operating system being configured to prevent display of non-driving-related information from the application program to the driver when the vehicle is moving;
   wherein the operating system allows application programs to designate certain information as being driving-related so that such information is displayed on the display device even when the vehicle is moving.

2. A vehicle computer system as recited in claim 1, wherein:
   the operating system allows application programs to open display windows on the display device;
   the application programs specify attributes relating to such windows; and
   such attributes include an indication of whether the windows contain driving-related information.

3. A vehicle computer system as recited in claim 1, wherein the display device is moveable between a first position in which it is viewable by the driver and a second position in which it is not viewable by the driver, the vehicle computer system further comprising:
   a sensor that indicates when the display device is moved to its first position;
   wherein the sensor is connected to be read by the processor.

4. A vehicle computer system as recited in claim 1, wherein the display device is moveable between a first position in which it is viewable by the driver and a second position in which it is not viewable by the driver, the vehicle computer system further comprising:
   a sensor that indicates when the display device is moved to its second position;
   wherein the sensor is connected to be read by the processor;
   wherein the operating system is further configured to allow display of non-driving-related information on the display device when the display device is moved to its second position.

5. A vehicle computer system as recited in claim 1, wherein the operating system is further configured to allow display of non-driving-related information to the driver when the vehicle is not moving.

6. A vehicle computer system as recited in claim 1, further comprising;
   one or more sensors that detect when the vehicle is moving;
   wherein the operating system is responsive to the one or more sensors to allow display of non-driving-related information to the driver when the vehicle is not moving.

7. A vehicle computer system as recited in claim 1, further comprising;
   a first sensor that detects when the vehicle is moving;
   a second sensor that detects a vehicle control state indicating a potential for vehicle movement;
   wherein the operating system is responsive to the sensors to allow display of non-driving-related information to the driver when both of the following conditions are true: (a) the first sensor indicates that the vehicle is not moving and (b) the second sensor indicates that there is no potential for vehicle movement.

8. A vehicle computer system as recited in claim 1, wherein the operating system is configured to prevent display of non-driving-related information on the display device only when the display device is configured for viewing by the driver.

9. A vehicle computer system as recited in claim 1, wherein:
   the operating system is configured to allow display of non-driving-related information to the driver when the vehicle is not moving; and
   the operating system is configured to allow display of non-driving-related information on the display device when the display device is not configured for viewing by the driver.

10. A vehicle computer system comprising:
   a processor that is capable of executing application programs;
   a display device that is configurable for viewing by a driver of a vehicle while the vehicle is moving, the display device being responsive to the processor;
   a first sensor that indicates when the display device is configured for viewing by the driver;
   at least a second sensor that indicates when the vehicle is moving;
   an operating system that is executed by the processor;
   the operating system being responsive to the sensors to allow display of non-driving-related information on the display device only when either of the following conditions are true: (a) the display is not configured for viewing by the driver or (b) the vehicle is not moving;
   wherein the operating system allows application programs to designate certain information as being driving-related so that such information is displayed on the display device even when neither of the conditions are true.

11. A vehicle computer system as recited in claim 10, wherein:
   the operating system allows application programs to open display windows on the display device;
   the application programs specify attributes relating to such windows; and such attributes indicate whether the windows contain driving-related information.

12. A computer-readable storage medium containing an application program that is to be executed by a vehicle computer system, the application program having instructions for performing steps comprising:

interacting with an operating system to open one or more display windows;

indicating to the operating system whether respective windows are driving-related and whether the windows are to be displayed to the driver when the vehicle is moving, wherein non-driving-related windows are not to be displayed to a driver of a vehicle when the vehicle is moving.

13. A computer-readable storage medium as recited in claim 12, wherein the indicating step comprises setting an attribute when opening a window to indicate that the window is driving-related.

14. A computer-readable storage medium containing instructions that are executable by a computer system on a vehicle to perform steps comprising:

opening windows in response to requests by application programs, wherein the requests indicate whether the windows contain driving-related information;

detecting when the vehicle is moving;

preventing display of non-driving-related information to the driver when the vehicle is moving;

allowing display of non-driving-related information on the display device when the display device is not viewable by the driver.

15. A computer-readable storage medium as recited in claim 14, wherein the detecting step comprises responding to more than one sensor.

16. A computer-readable storage medium as recited in claim 14, wherein the detecting step comprises responding to at least two sensors, a first of the sensors indicating vehicle motion, a second of the sensors indicating a potential for vehicle movement.

17. A method of displaying information to a driver of a vehicle, comprising the following steps:

submitting requests to an operating system to open display windows on a display device in a vehicle;

indicating in the requests whether the respective windows contain driving-related information;

displaying only windows containing driving-related information to the driver when the vehicle is moving, and allowing display of windows containing non-driving-related information on the display device when the display device is not viewable by the driver.

18. A method as recited in claim 17, further comprising the following additional steps:

detecting a vehicle control state indicating a potential for vehicle movement;

preventing display of windows containing non-driving-related information to the driver when the vehicle control state indicates a potential for vehicle movement.

19. A method as recited in claim 17, further comprising the following additional steps:

detecting when the vehicle is in a park setting;

preventing display of windows containing non-driving-related information to the driver when the vehicle is in the park setting.

20. A method as recited in claim 17, further comprising the following additional steps:

detecting when the vehicle has its parking brake set;

allowing display of windows containing non-driving-related information to the driver when the vehicle has its parking brake set.

* * * * *